Dec. 13, 1960 W. G. LUEDTKE ET AL 2,964,137
BRAKE STRUCTURE
Filed Nov. 20, 1957 3 Sheets-Sheet 1

INVENTORS
WILLIAM G. LUEDTKE
BERNARD E. WRENSCH
BY
Wheeler, Wheeler & Wheeler
ATTORNEYS Dec. 13, 1960 W. G. LUEDTKE ET AL 2,964,137
BRAKE STRUCTURE
Filed Nov. 20, 1957 3 Sheets-Sheet 2
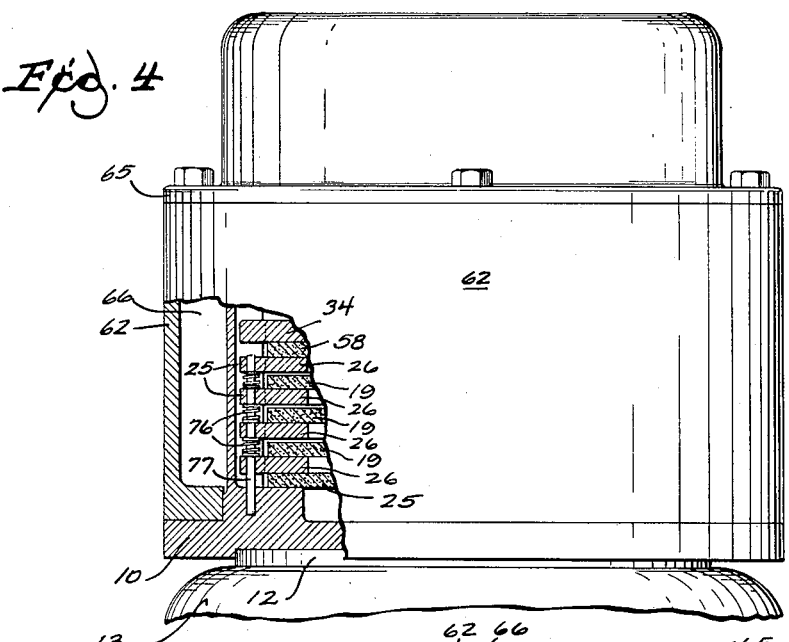
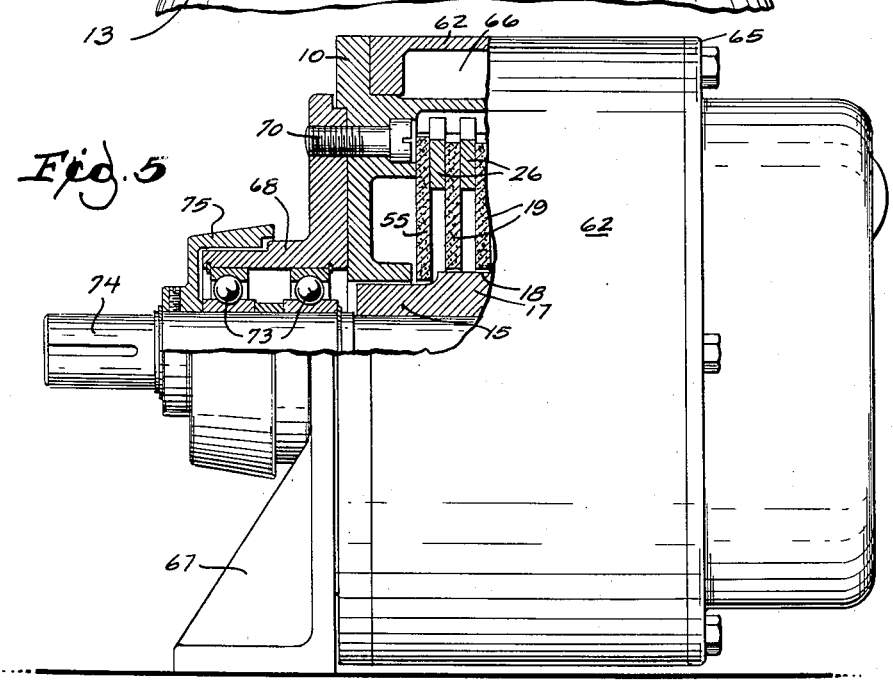
INVENTORS
WILLIAM G. LUEDTKE
BERNARD E. WRENSCH
BY
Wheeler, Wheeler & Wheeler
ATTORNEYS

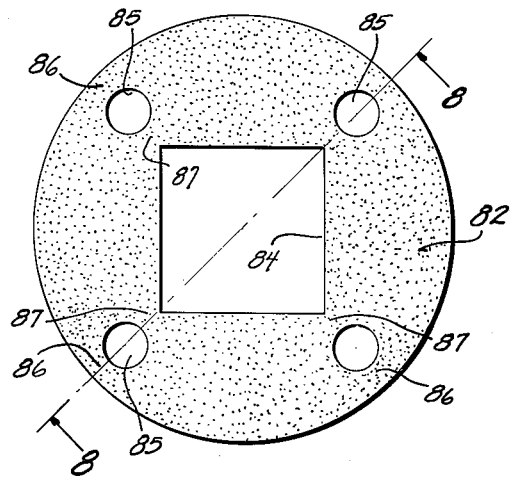
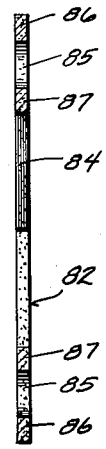
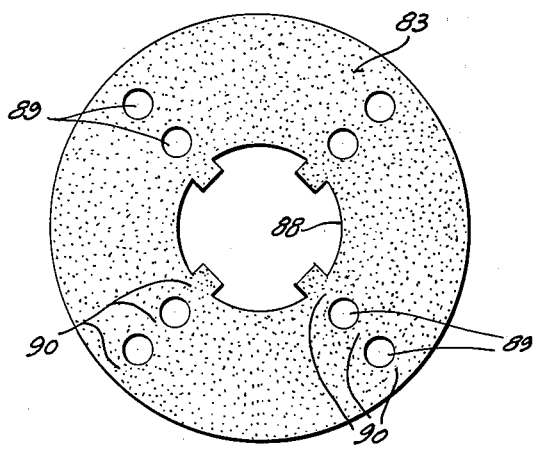

United States Patent Office 2,964,137
Patented Dec. 13, 1960

2,964,137

BRAKE STRUCTURE

William G. Luedtke and Bernard E. Wrensch, Milwaukee, Wis., assignors to R. H. Stearns, Milwaukee, Wis.

Filed Nov. 20, 1957, Ser. No. 697,719

19 Claims. (Cl. 188—71)

This invention relates to a brake structure adapted for service in an explosive atmosphere.

This application is a continuation in part of our co-pending application Serial No. 608,969, filed September 10, 1956, now abandoned, and includes subject matter divided therefrom.

It is the object of the present invention to adapt the type of brakes shown generally in patents 2,059,244 and 2,620,901 for service in an explosive atmosphere by adding thereto a structure which keeps the temperature of the external surface of the brake below that which might otherwise cause ignition of the explosive atmosphere.

In the device of the present invention the temperature of the external surface of the brake is not permitted to rise above permissible levels even when the brake is slipped continuously at full torque.

To accomplish the foregoing objects, one embodiment of the brake structure of the present invention is provided with heat barrier means which confines the heat generated by brake operation to the immediate vicinity of the friction disks.

The conventional braking material of which the friction disks are fabricated is mechanically weak at elevated temperatures. Accordingly, by confining the heat to the vicinity of these friction disks, we induce mechanical failure thereof before sufficient heat is generated to cause a hazardous increase in tempearture of the external surface of the brake. In this manner further generation of heat is discontinued long before a dangerous condition is created.

In the preferred embodiment of the invention aforesaid, we provide heat barriers adjacent the friction disk surfaces. These barriers not only confine heat to the immediate vicinity of the friction disks but they also function to reduce the rate of heat transfer from the disks to the brake housing.

To further insulate the external surfaces of the brake from heat generated in the friction disks, we desirably provide a housing jacket which surrounds the brake mechanism and is spaced from the brake housing. This jacket may preferably be made of a metal which has a high rate of heat conductivity whereby to rapidly dissipate heat therefrom. Accordingly, jacket temperature is maintained at a minimum.

Where the brake is mounted with its rotor parts on an upright axis, we also provide spring means for biasing the friction disks apart when relieved of braking pressure. This structure actively releases the braking mechanism.

In another embodiment of the invention, which may optionally incorporate the heat barrier and/or housing jacket aforesaid, the friction disks are mechanically weakened to promote failure thereof at elevated temperatures. In practice, we remove material from the disks in a pattern which will not result in disk failure under ordinary operating conditions but which will result in disk failure at sustained elevated temperature.

Other features and advantages of the invention will be more apparent upon an examination of the following disclosure in which:

Fig. 4 is a side elevation, partly in axial cross section, of a braking device which is mounted on a vertical axis.

Fig. 5 is a view partially in elevation and partially in cross section of a braking mechanism embodying the invention mounted on a floor stand, the brake being adapted to be connected to a remote motor or the like.

Figs. 6 and 7 are views of friction disk modifications which are mechanically weakened for the purposes of the invention.

Fig. 8 is a cross section along the line 8—8 of Fig. 6.

Figure 3:
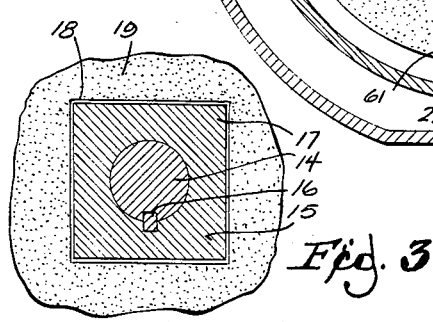
Fig. 3 is a cross sectional view taken along the line 3—3 of Fig. 1.

The general structure of the device of the present invention is patterned after the mechanism shown in the prior patents aforesaid. In the embodiment of the invention shown in Fig. 1, the device comprises a mounting ring 10 which may be fastened by means of the bolts 11 to the end wall 12 of a motor 13 which has an axially projecting rotor shaft 14. The brake has a rotor sleeve 15 which may be keyed at 16 to shaft 14. As best shown in Fig. 3, rotor 15 is of square or other non-circular cross section at 17 whereby to be keyed to the complementary openings 18 formed in the friction disks 19.

The friction disks are composed of conventional braking material, characterized by mechanical weakness at elevated operating temperature. At sustained elevated operating temperatures the friction disks 19 will fail mechanically when subjected to normal braking pressures.

From mounting ring 10 extends a brake housing cylinder 22 on the inside surface of which are provided longitudinally extending ribs 23. The ribs are grooved at 24 to receive radially projecting ears 25 on the annular braking rings 26 which are interposed between the friction disks 19 and thereby anchor the rings against rotation. The housing cylinder 22 is further provided with an end wall 27 which carries on bracket 28 a lever 29 having a central aperture 30 in which a plunger head 31 which engages the pressure plate 34 is disposed. The pressure plate 34 also has ears 35 which ride in grooves 24 to restrain the plate from rotation and to guide it for axial movement.

The pressure plate 34, mounting ring 10 and braking rings 26 are all held against rotation while the friction disks 19 are required to rotate with the motor shaft 14. Accordingly, if the pressure plate is moved toward the left as viewed in Fig. 1, braking pressure will be exerted between the peripheral portions of the friction disks 19 and the annular rings 26 to brake the shaft.

The pressure of pressure plate 34 on the disks 19 is determined by the tension of coil spring 36 which is mounted in a sleeve 37 threaded to tapped hub 38 in housing wall 27. The pressure of the spring 36 may be adjusted by turning screw threaded plug 39 against which the spring is seated. Lever 29 has a cross pin 41 which extends through axially elongated slots 42 in the sides of sleeve 31. Pin 41 normally transmits the pressure of spring 36 through spring seat 51 to the plunger head 31 and thence to the pressure plate 34.

Pressure of the spring 36 on the pressure plate 34 may be released by energizing the solenoid 43 which draws down on the link 44 to pivot lever 45 about its pivotal connection at 46 with a bracket 47 mounted on the inside surface of wall 27. Rotation of lever 45 will exert an outward pressure against the roller 48 which is mounted at the upper end of lever 29, thereby urging cross pin 41 against spring seat 51 to absorb the tension of spring 36 and release its pressure on pressure plate 34.

In addition to the electromagnetic means for releasing the pressure on the spring there is provided a manual release mechanism consisting of the rotary plug 52 which has a crank arm 53 which may engage the lug 54 on the solenoid armature link 44. Plug 52 has a finger grip 50.

As thus far described, the device is conventional. However, where the brake is to be used in an explosive atmosphere, for example where the air is laden with explosive gases: grain, coal or metal dust, etc., it is desirable to eliminate any source of heat having a temperature level high enough to cause ignition of the explosive atmosphere. The conventional brake of the type described develops considerable heat when the friction disks rotate under braking pressure. The heat dissipated from the disks is ordinarily sufficient to raise the temperature of the braking housing 22 to the point of igniting the explosive atmosphere.

The aforesaid brake embodiment of the present invention is designed for safe operation in an explosive atmosphere by purposely confining the heat generated by the friction disks to the immediate vicinity thereof so that the elevated temperature within the brake mechanism is sufficiently high to cause mechanical failure of the friction disks 19. When the disks fail they will no longer function as a brake and generation of heat is discontinued. While the inoperativeness of the brake thus induced is temporarily inconvenient, it is preferred to the explosion which might otherwise occur if the temperature of the brake housing is permitted to rise to hazardous levels.

For the purpose of confining the heat about disks 19 we provide one or more heat barriers, these being desirably disposed in heat blocking relation to metallic surfaces of large area which would otherwise act to conduct heat away from the vicinity of the disks 19. One such heat barrier 55 is desirably disposed between the mounting ring 10 and the first braking ring 26. The heat barrier 55 is desirably made of a heat resistant material such as asbestos. It has a central circular opening 56 which aligns with a circular portion 57 of the rotor sleeve 15. Accordingly, the heat barrier disk 55 is not connected to the rotor which is free to turn therewithin. With the heat barrier 55 in place, such heat as is generated in the friction disks 19 will be closely confined thereabout for the purpose aforestated.

While for many applications we find that a single heat barrier disk 55 will suffice for our purpose, we may optionally provide a second heat barrier disk 58 between the pressure plate 34 and the next adjacent braking ring 26. Thus both ends of the space occupied by the disks 19 are provided with heat barrier disks.

In this connection it is noted that inasmuch as the braking ring 10 and the first braking ring 26 are held against rotation, there is no need for anchoring the heat barrier disk 55 to the ribs 23 of the housing 22. The same is true of heat barrier disk 58 which may simply float between pressure plate 34 and the last braking ring 26.

If desired we may optionally provide pins 61 which extend through the first braking ring 26, the first heat barrier disk 55 and into the mounting ring 10. The pins hold the heat barrier and first braking ring 26 securely to the mounting ring, thus reducing the number of elements which are free to move axially when the pressure on pressure plate 34 is released and providing more axial space into which the friction disks 19 may expand.

While the primary purpose of the disks 55, 58 is to confine such heat as is generated by the friction disks to the vicinity thereof, they incidentally heat insulate the zone of high temperature about the friction disks from the metal parts of the device which might otherwise rapidly convey such heat to the external surfaces of the brake.

To further insulate the external surface of the brake from the ambient atmosphere, we may provide a cylindrical heat jacket 62 which may be connected by means of bolts 63, 64 respectively to the housing flange 65, and the mounting ring 10. The space 66 between the housing wall 22 and the external jacket 62 may be left as a dead air space or it may be filled with heat insulating material. The jacket 62 is desirably made of a metal which has a high coefficient of heat conductivity whereby to rapidly dissipate such heat as is conducted thereto and thus keep its surface temperature at a minimum. Aluminum is an example of such a metal.

In the foregoing structure the heat barrier disks 55, 58 reduce the rate of heat dissipation in an axial direction and the jacket 62 reduces the rate of heat dissipation radially.

While the foregoing features may be used separately and independently, we find that for installations requiring brakes of large capacity and where great quantities of heat are generated, all of these features may be combined for best results in the same structure.

Figure 1:
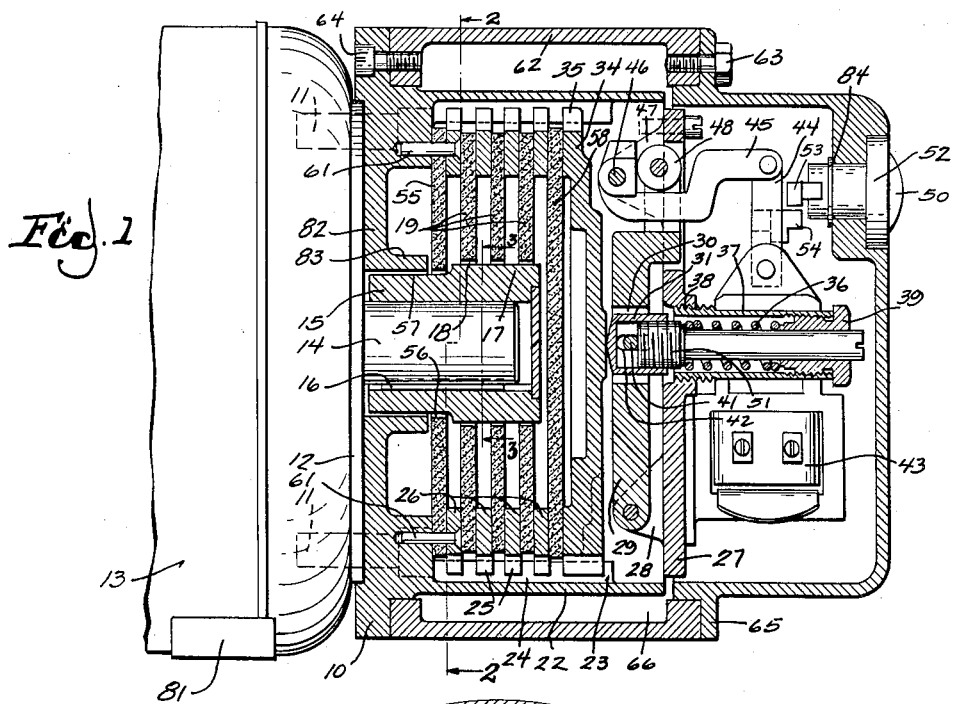
Fig. 1 is an axial cross section taken through a brake mechanism embodying the invention, the device being shown connected to the shaft of an electric motor otherwise shown only fragmentarily.

Fig. 5 illustrates the brake structure of Fig. 1 detached from direct connection to a motor shaft and mounted on a floor stand which has a bracket 67 to which the mounting ring 10 may be bolted at 70. A sleeve 68 projects from the bracket 67 and is provided with axially spaced ball bearings 73 which support a power input shaft 74 to which a pulley or any other power transmitting device may be attached. In this manner the brake mechanism may be connected to a remote motor or other device with which the brake is intended to cooperate.

The bearings 73 may be protected against ambient dust, etc., by means of the slinger drum 75 which tends to centrifugally expel such dust as may otherwise tend to enter the bearing. In other respects the device shown in Fig. 4 may be substantially identical with the device shown in Fig. 1.

In Fig. 4 we illustrate a brake which is adapted to be mounted with its rotor disposed on a vertical axis. Inasmuch as gravity may tend to hold the friction disks 19 in braking relation to the braking rings 26 even if the pressure plate 34 is released, we dispose between the projecting ears 25 of the intermediate braking rings 26 coil springs 76 which may be guided on a common rod 77 extending through the aligned ears 25. The springs are easily contracted under pressure of the pressure plate 34 for braking action but will resiliently separate the braking rings from contact with adjacent friction disks when the pressure on pressure plate 34 is released.

Figure 2:
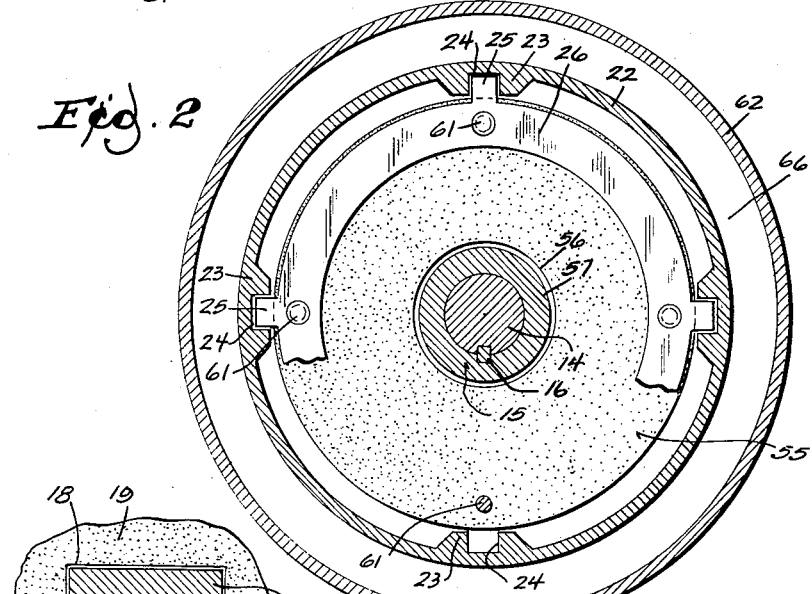
Fig. 2 is a cross sectional view taken along the line 2—2 of Fig. 1.

As best shown in Fig. 2, the bottom portion of jacket 62 may be flattened as shown at 78. This reduces the radial dimension of the jacket at its bottom to permit the brake to be mounted on the end of a motor which has feet 81 which rest on a floor and beyond which the jacket 62 might extend radially if it were circular whereby to interfere with the floor mounting of the motor.

In addition to the foregoing features, the device of the present invention is specially adapted to exclude dust from the interior of the brake housing. Danger of internal explosion is thus greatly minimized. For this purpose the brake housing is substantially dust sealed about any movable part which extends therethrough.

Mounting ring 10 is provided with a wall 82 which intervenes between the brake and the motor 13. Wall 82 is provided with an axially elongated hub 83 which clears the circular portion 57 of rotor sleeve 15 by no more than about five to seven thousandths of an inch (the clearance being greatly exaggerated in the drawing). The elongated narrow path for dust thus provided, plus the natural tendency for motor rotation to centrifugally expel dust away from the brake, results in very little if any dust entering the brake housing through the motor shaft opening.

Moreover, the rotary plug 52 of the manual release mechanism is held in relatively tight dust excluding relation to the brake housing by retainer ring 84 which snugly seats the plug 52 in its housing wall socket.

The brake embodiment shown in Fig. 5 is similarly provided with the dust seals aforesaid, in addition to slinger drum 75 which functions in the absence of any direct connection to a motor to centrifugally exclude dust from entering the interior of the brake housing.

Figs. 6 and 7 illustrate modified friction disks 82, 83 which are weakened mechanically and which are thus adapted to more readily fail at elevated temperatures. These friction disks may be substituted for disks 19 in the previously described embodiments of the invention. Heat barriers 55, 58 and housing jacket 62 may optionally remain where disks 82, 83 are used, although in some instances, particularly in smaller brakes, the heat barriers 55, 58 and housing jacket 62 may be omitted.

Friction disk 82 has a relatively large square opening 84 by which it is keyed to rotor 15, as shown in Fig. 3. Near the corners of the square opening 84 the disk 82 is apertured at 85, thus leaving only narrow webs 86, 87 to circumferentially connect the disk portion otherwise divided by the apertures 85. The apertures 85 mechanically weaken the disk to promote its failure at elevated temperature. The narrow webs 86, 87 will fail before there is a hazardous temperature rise at the exterior brake surfaces.

Friction disk 83 may have a central circular opening 88 which is relatively smaller than opening 84 of disk 82. Near the keying lugs 92, disk 83 may be weakened by providing a series of apertures 89 radially aligned with lugs 92 in a pattern which leaves narrow webs 90 circumferentially connecting the portions of disk 83 otherwise divided by the apertures 89.

Other aperture patterns which mechanically weaken the disks are broadly within the scope of the invention.

We have found that the area of apertures 85, 89 will average about five percent (5%) of the total disk area for satisfactory results.

We claim:

1. A brake of the character described and adapted for service in an explosive atmosphere, said brake comprising a housing, friction members within the housing and characterized by mechanical weakness at sustained elevated temperatures, and means forming a heat barrier between the housing and friction members and confining such heat as is generated by braking action to the immediate vicinity of said friction members whereby to promote such increase in temperature of the friction members that they will fail mechanically before the external temperature of the brake rises to a hazardous level.

2. The device of claim 1 in further combination with a heat insulating jacket radially between the housing and the atmosphere to reduce the rate of heat transfer radially from said housing to the atmosphere.

3. A brake of the character described and adapted for service in an explosive atmosphere, said brake comprising friction members characterized by mechanical weakness at sustained elevated temperatures, and means forming a heat barrier confining such heat as is generated by braking action to the immediate vicinity of said friction members whereby to promote such increase in temperature of the friction members that they will fail mechanically before the external temperature of the brake rises to a hazardous level, said brake further comprising a mounting ring part and a pressure plate part movable with respect to said ring part and between which parts said friction members are disposed, said heat barrier means comprising a heat resistant plate between said mounting ring and said friction members.

4. A brake of the character described and adapted for service in an explosive atmosphere, said brake comprising friction members characterized by mechanical weakness at sustained elevated temperatures, and means forming a heat barrier confining such heat as is generated by braking action to the immediate vicinity of said friction members whereby to promote such increase in temperature of the friction members that they will fail mechanically before the external temperature of the brake rises to a hazardous level, said brake further comprising a mounting ring part and a pressure plate part movable with respect to said ring part and between which parts said friction members are disposed, said heat barrier means comprising a heat resistant plate between said pressure plate and said friction members.

5. The device of claim 1 in further combination with a heat insulating jacket radially between the housing and the atmosphere to reduce the rate of heat transfer radially from said housing to the atmosphere, said jacket comprising a shell spaced outwardly from said housing, said shell comprising metal having a high rate of heat conductivity whereby to rapidly dissipate heat without hazardous increase in shell temperature.

6. The device of claim 1 in which said friction members are provided with apertures to mechanically weaken them.

7. The device of claim 6 in further combination with a heat insulating jacket surrounding said brake to reduce the rate of heat transfer radially from the brake to the atmosphere.

8. The device of claim 6 in which said friction members are provided with central square openings for keying the disks to a rotor, said apertures being disposed adjacent the corners of said central openings.

9. The device of claim 6 in which said apertures are disposed in a radial series pattern having narrow webs connecting portions of the friction members otherwise divided by said apertures.

10. A brake of the character described and adapted for service in an explosive atmosphere, said brake comprising heat producing friction members, a housing for such members, and a heat insulating barrier between said friction members and said housing whereby to slow the rate of heat conduction from said friction members to said housing.

11. The device of claim 10 in which said brake further comprises a mounting ring part and a pressure plate part movable with respect to said ring part and between which parts said friction members are disposed, said barrier comprising heat resistant plates respectively adjacent said ring and pressure plate, said friction members being disposed therebetween.

12. The device of claim 11 in further combination with a heat insulating jacket surrounding said brake to reduce the rate of heat transfer radially from said brake to the atmosphere.

13. A brake of the character described and adapted for service in an explosive atmosphere, said brake having a central rotor, heat producing friction disks keyed to said rotor, a mounting ring part at one side of said friction disks and a pressure plate part at the other side of said friction disks, means holding said parts against rotation with said rotor, and a heat resistant barrier disk adapted to confine such heat as is generated by braking action to the immediate vicinity of said friction disks and disposed between one of said parts and said friction disks, said barrier disk being free of connection to said rotor.

14. The device of claim 13 in which said heat resistant disk has a central opening in which said rotor is free to turn.

15. The device of claim 14 in further combination with means connecting said heat resistant disk to said mounting ring.

16. The device of claim 15 in further combination with spring means biasing said friction plates apart on release of the pressure of said pressure plate.

17. A brake of the character described and adapted for service in an explosive atmosphere, said brake comprising a rotor, friction members which heat up in the course of brake operation, said friction members being provided with means keying them to said rotor and with apertures which mechanically weaken the members and promote the failure of such members at elevated internal temperature before the external temperature of the brake rises to a hazardous level, said apertures being disposed only adjacent to said keying means to be directly subject to stresses transmitted from the key means to the friction members.

18. The device of claim 17 in which said rotor is square in cross section, said friction members being provided with central square openings constituting said keying means, said apertures being disposed adjacent the corners of said central openings.

19. The device of claim 17 in which said friction members are provided with lugs constituting said keying means, said apertures being disposed in a pattern radially aligned with said lugs and leaving narrow webs connecting portions of the friction members otherwise divided by said apertures.

References Cited in the file of this patent

UNITED STATES PATENTS

| | | |
|---|---|---|
| 698,112 | Hall | Apr. 22, 1902 |
| 1,347,785 | Libby | July 27, 1920 |
| 1,947,091 | Keller | Feb. 13, 1934 |
| 2,059,244 | Kiekaefer | Nov. 3, 1936 |
| 2,142,174 | Burrow | Jan. 3, 1939 |
| 2,163,884 | La Brie | June 27, 1939 |
| 2,217,464 | Arnold | Oct. 8, 1940 |
| 2,314,227 | Lieberherr | Mar. 16, 1943 |
| 2,368,317 | Myer et al. | Jan. 30, 1945 |
| 2,518,016 | Johnson et al. | Aug. 8, 1950 |
| 2,620,901 | Stearns | Dec. 9, 1952 |
| 2,801,714 | Dotto | Aug. 6, 1957 |
| 2,821,271 | Sanford | Jan. 28, 1958 |

UNITED STATES PATENT OFFICE
CERTIFICATION OF CORRECTION

Patent No. 2,964,137　　　　　　　　　　　　　　　December 13, 1960

William G. Luedtke et al.

It is hereby certified that error appears in the above numbered patent requiring correction and that the said Letters Patent should read as corrected below.

In the grant, lines 2 and 3, for "assignors to R. H. Stearns, of Milwaukee, Wisconsin," read -- assignors to R. H. Stearns and R. N. Stearns, of Milwaukee, Wisconsin, --; line 12, for "R. H. Stearns, his heirs" read -- R. H. Stearns and R. N. Stearns, their heirs --; in the heading to the printed specification, line 4, for "assignors to R. H. Stearns, Milwaukee, Wis." read -- assignors to R. H. Stearns and R. N. Stearns, Milwaukee, Wis. --.

Signed and sealed this 9th day of May 1961.

(SEAL)
Attest:

ERNEST W. SWIDER
Attesting Officer

DAVID L. LADD
Commissioner of Patents